United States Patent [19]

Imaizumi

[11] Patent Number: 5,598,296
[45] Date of Patent: Jan. 28, 1997

[54] PRISMATIC TELESCOPE OPTICAL SYSTEM

[75] Inventor: Masaki Imaizumi, Hachioji, Japan

[73] Assignee: Olympus Optical Co., Ltd., Tokyo, Japan

[21] Appl. No.: 458,063

[22] Filed: Jun. 1, 1995

[30]   Foreign Application Priority Data

Jun. 1, 1994  [JP]  Japan ..................... 6-119870

[51] Int. Cl.$^6$ ..................... G02B 15/14
[52] U.S. Cl. ............ 369/421; 359/422; 359/431; 359/432; 359/835
[58] Field of Search ............ 359/362, 421, 359/422, 423, 431, 432, 433, 831, 834, 835; 354/219, 220, 221, 222, 223, 224, 225

[56]         References Cited

U.S. PATENT DOCUMENTS

| | | | |
|---|---|---|---|
| 3,064,532 | 11/1962 | Lescher et al. | 359/399 |
| 3,918,791 | 11/1975 | Perry | 350/42 |
| 3,989,349 | 11/1976 | Besenmatter et al. | 350/33 |
| 4,427,268 | 1/1984 | Ikemori | 350/422 |
| 4,497,548 | 2/1985 | Burris | 350/560 |
| 4,548,481 | 10/1985 | Yamada | 350/559 |
| 4,906,078 | 3/1990 | Inabata et al. | 350/423 |
| 5,052,791 | 10/1991 | Kikuchi | 359/421 |
| 5,144,480 | 9/1992 | Ohshita | 359/432 |
| 5,311,355 | 5/1994 | Kato | 359/432 |
| 5,371,626 | 12/1994 | Betensky | 359/399 |
| 5,381,265 | 1/1995 | Ohshita | 359/422 |
| 5,392,084 | 2/1995 | Kato | 354/222 |
| 5,410,430 | 4/1995 | Ito et al. | 359/422 |
| 5,448,400 | 9/1995 | Kikuchi et al. | 359/422 |

*Primary Examiner*—Timothy P. Callahan
*Assistant Examiner*—My-Trang Nu Ton
*Attorney, Agent, or Firm*—Cushman, Darby & Cushman IP Group of Pillsbury Madison & Sutro LLP

[57]         ABSTRACT

A prismatic telescope optical system is available to include one of a plurality of optical systems different in magnification from one another, each having an objective system, an image erecting prism system, and an eyepiece system. Each of plurality of optical systems is constructed so that its respective overall length is are made practically equal by varying the refractive indices of an included image erecting prism system.

7 Claims, 10 Drawing Sheets

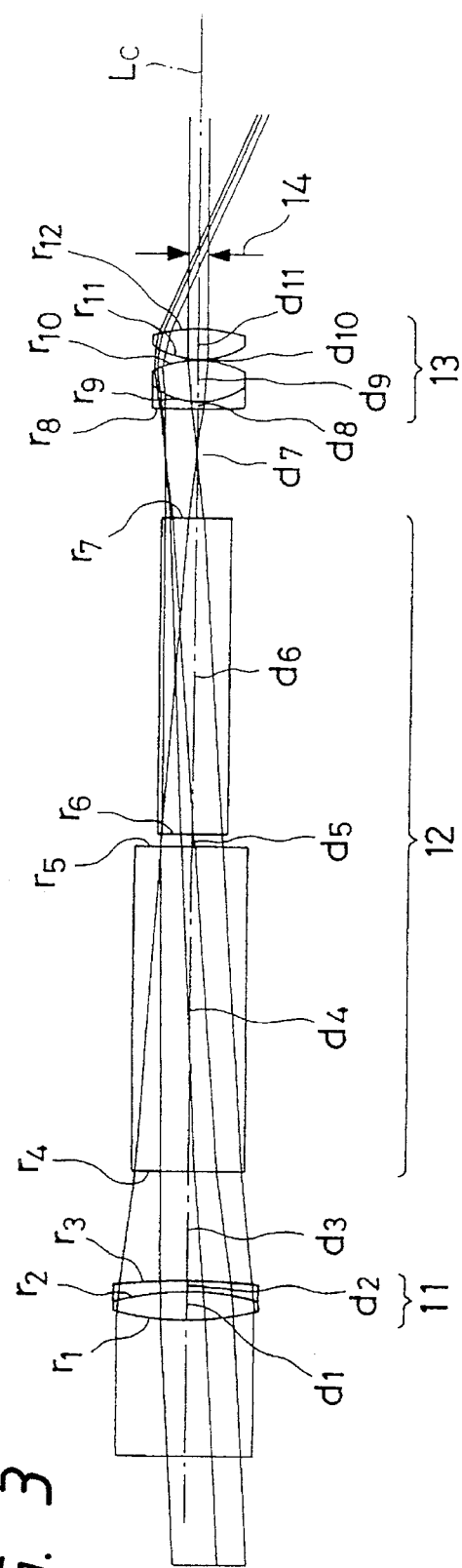
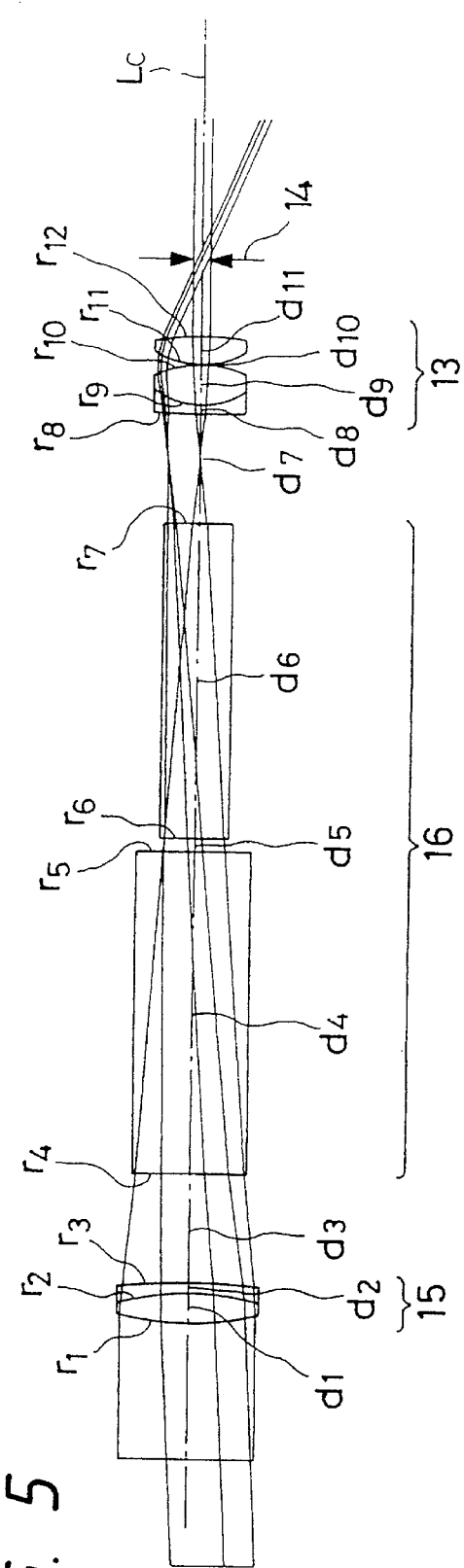
FIG. 3
FIG. 5

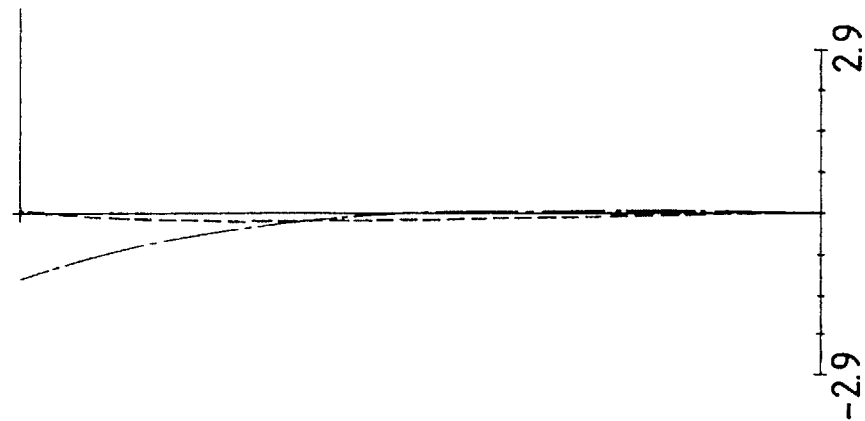
*FIG. 4C* CHROMATIC ABERRATION OF MAGNIFICATION
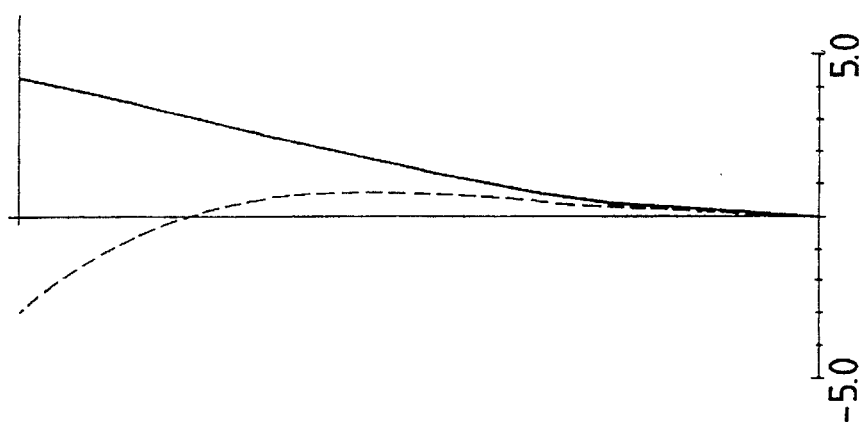
*FIG. 4B* ASTIGMATISM
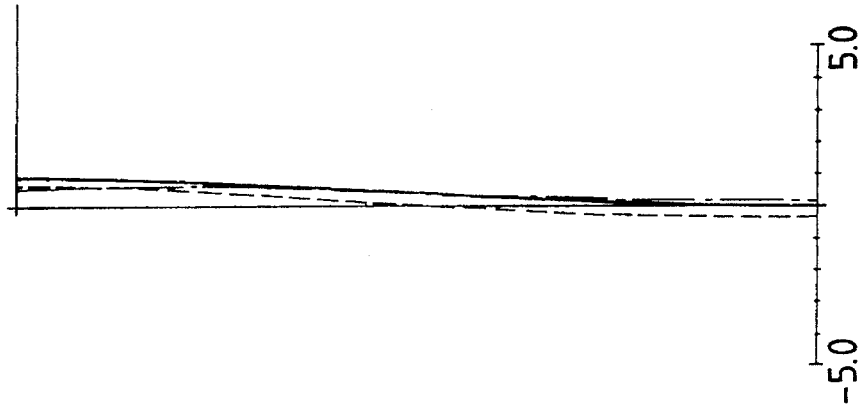
*FIG. 4A* ABERRATION

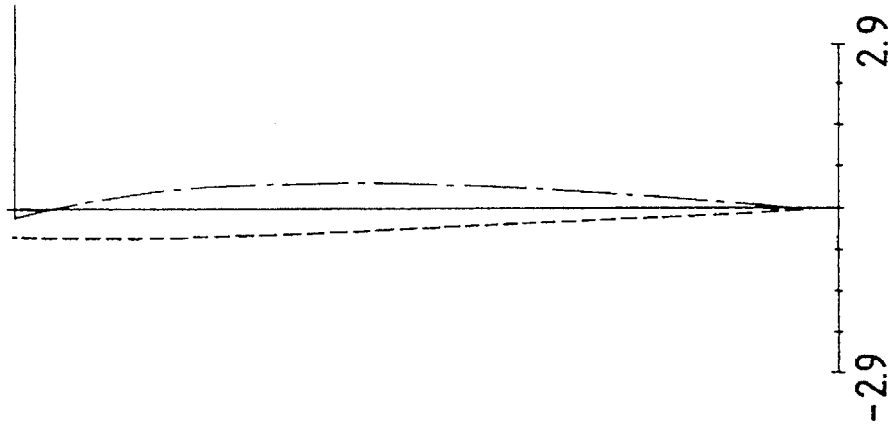
FIG. 6C CHROMATIC ABERRATION OF MAGNIFICATION
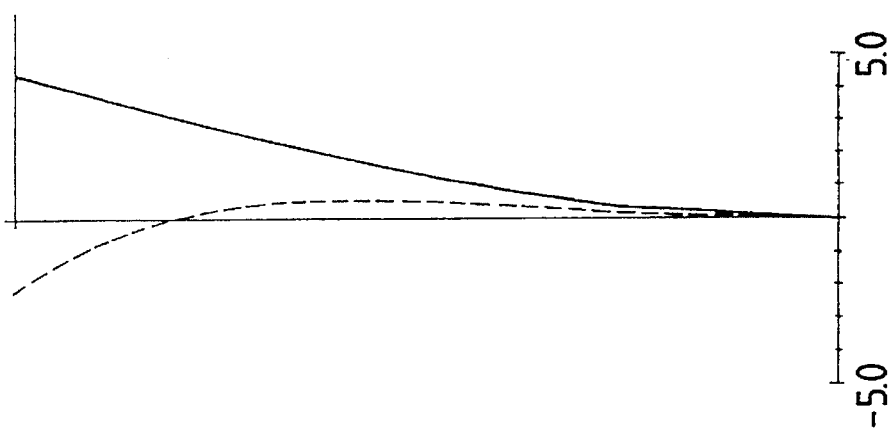
FIG. 6B ASTIGMATISM
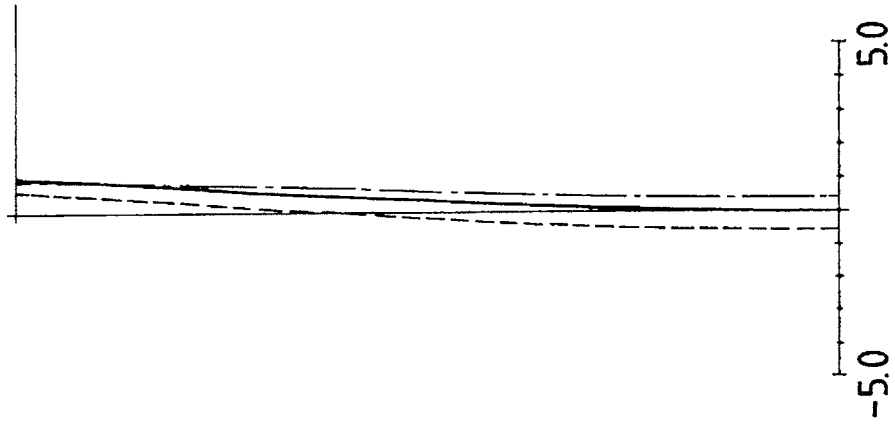
FIG. 6A ABERRATION

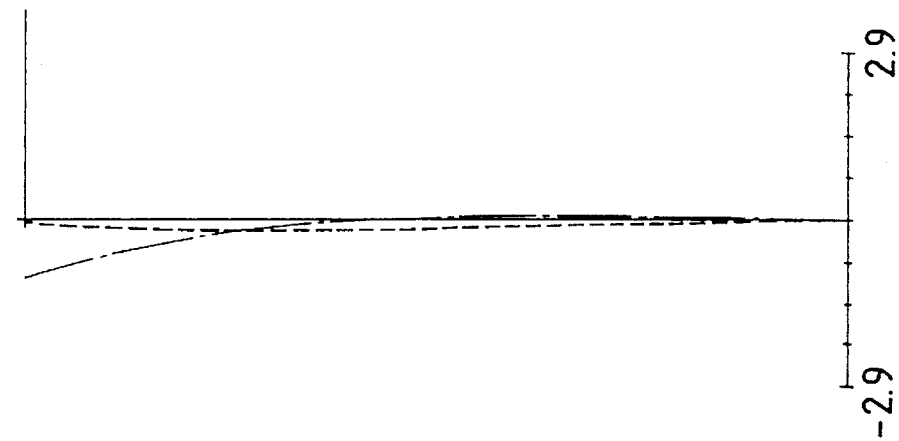
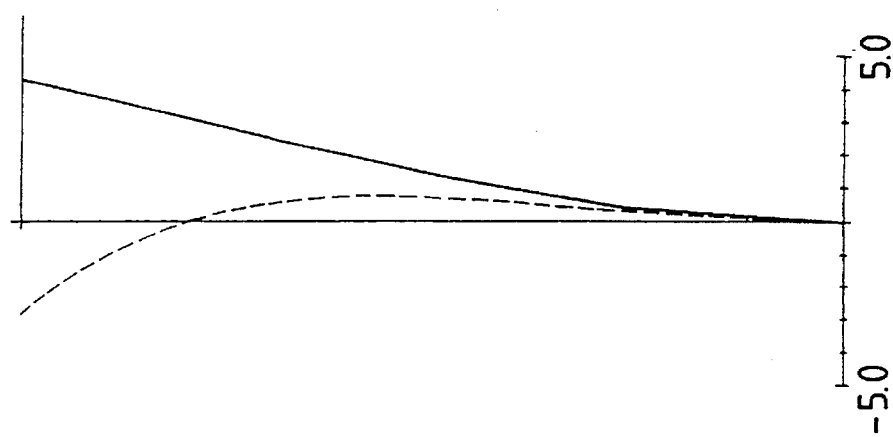
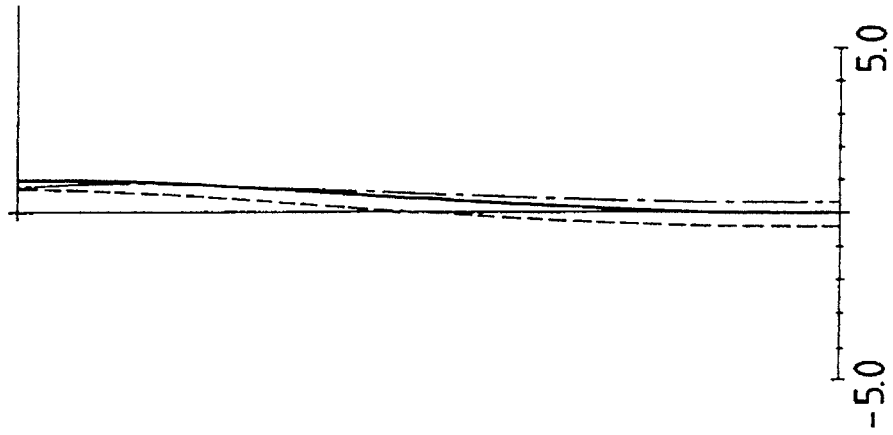

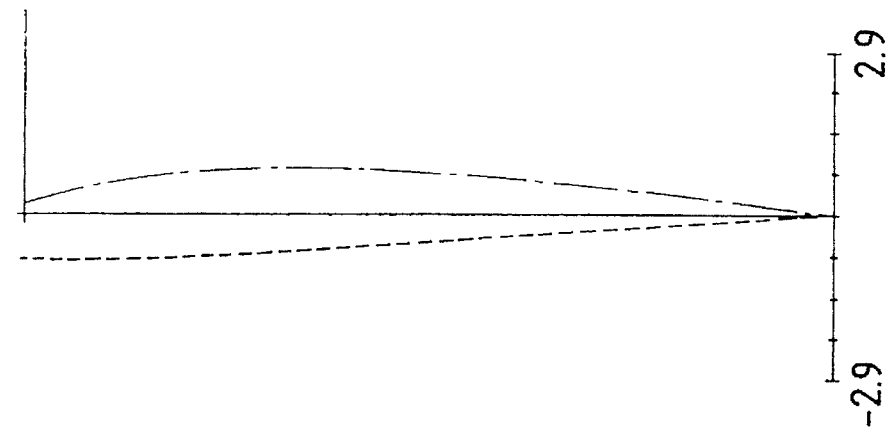
FIG. 10C CHROMATIC ABERRATION OF MAGNIFICATION
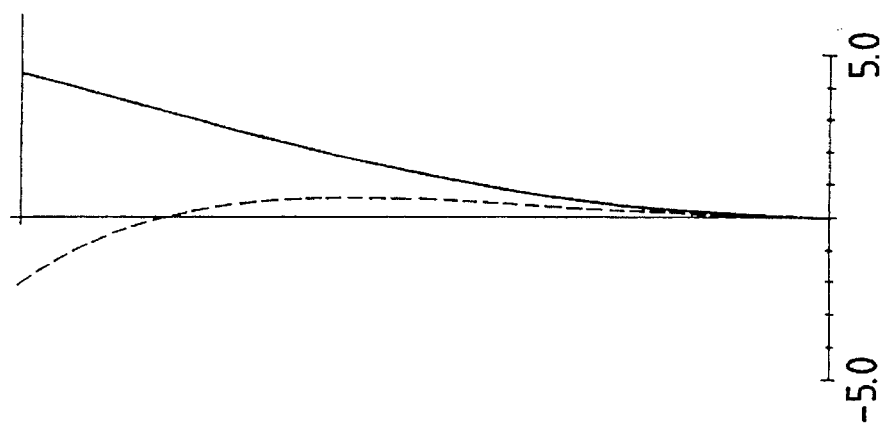
FIG. 10B ASTIGMATISM
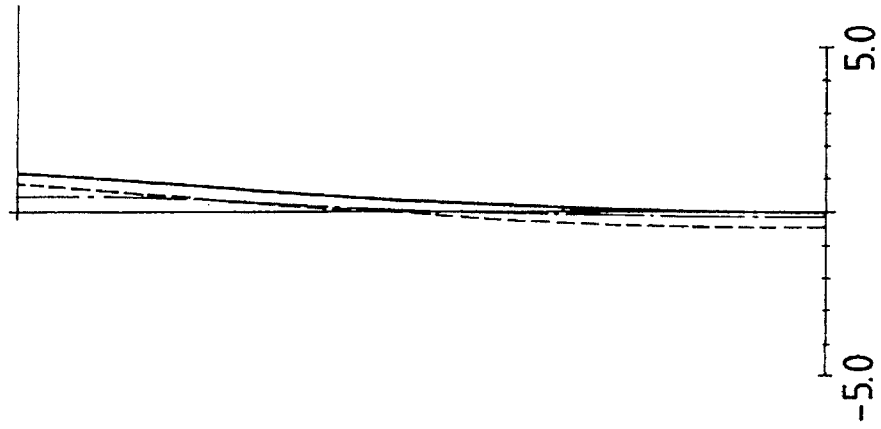
FIG. 10A ABERRATION

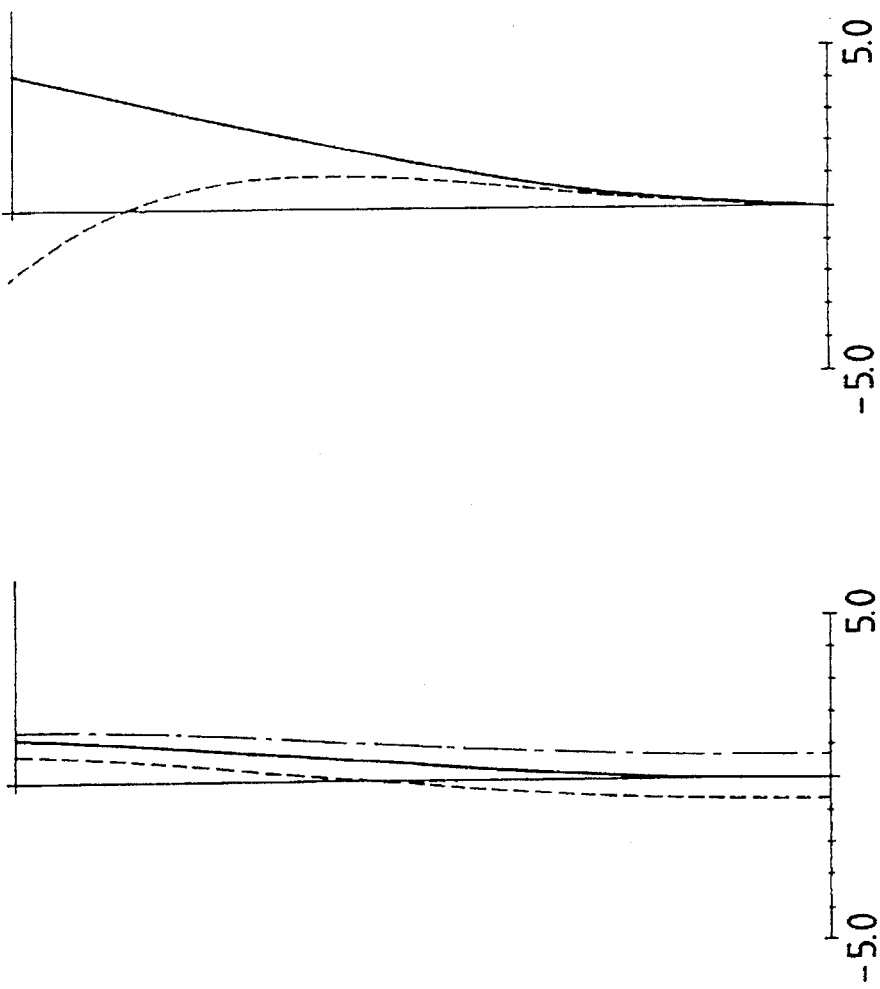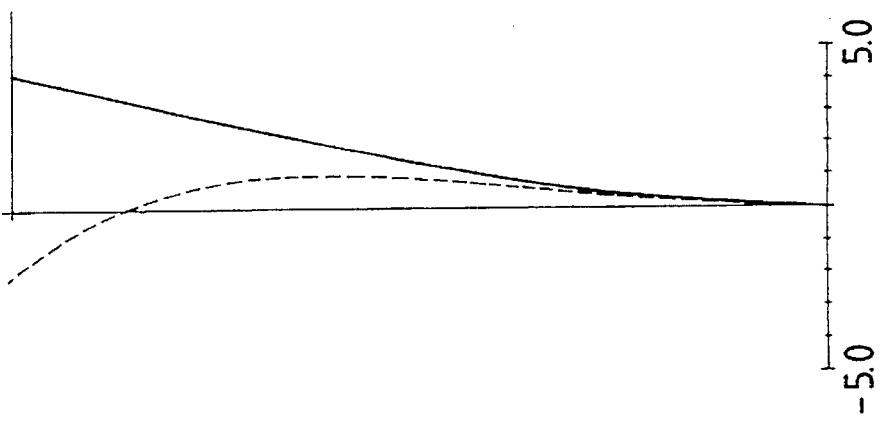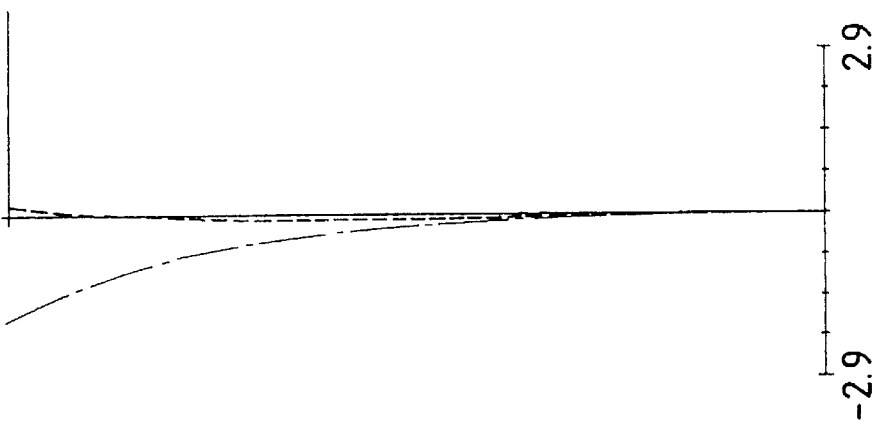

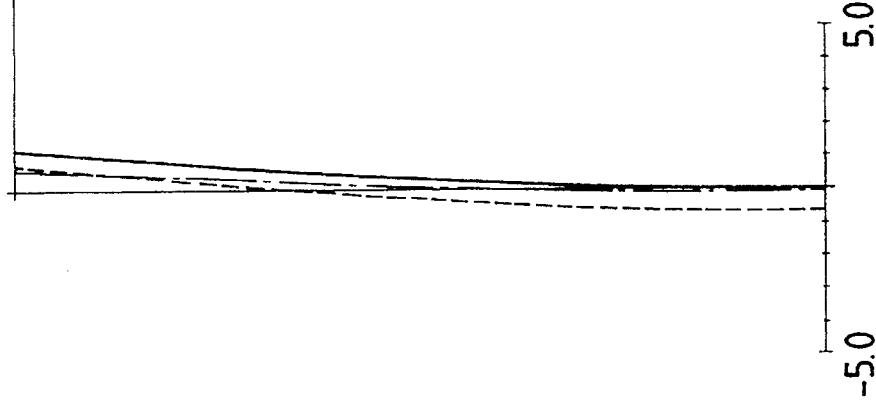
FIG. 14A ABERRATION
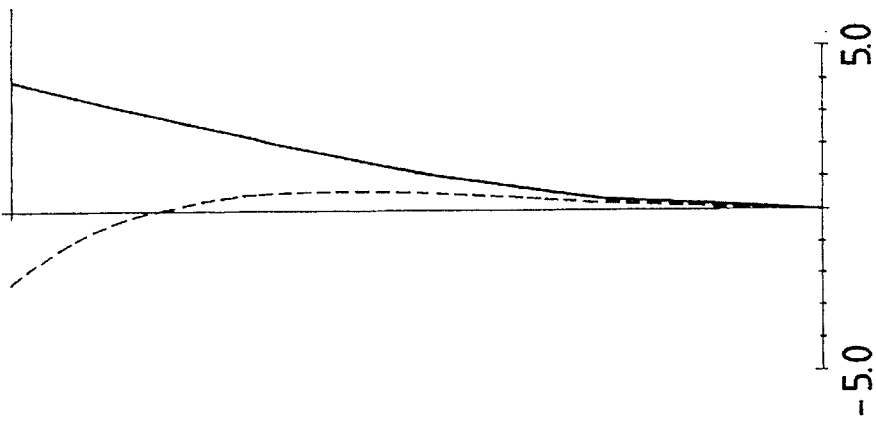
FIG. 14B ASTIGMATISM
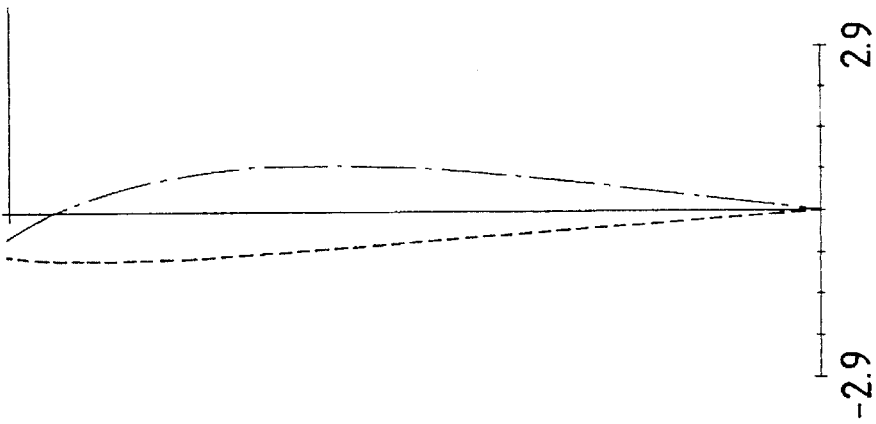
FIG. 14C CHROMATIC ABERRATION OF MAGNIFICATION

PRISMATIC TELESCOPE OPTICAL SYSTEM

BACKGROUND OF THE INVENTION

1. Field of the Invention

This invention relates to a telescope optical system which is constructed so that a plurality of prismatic telescope optical systems with different magnifications for observation, each having an objective system, an image erecting prism system, and an eyepiece system, are practically equal in overall length, irrespective of the different magnifications.

2. Description of Related Art

FIG. 1 shows an example of the arrangement of a conventional prismatic telescope optical system. As seen from this figure, the conventional prismatic telescope optical system is constructed with an objective system 1, an image erecting prism system (using Porro prisms) 2, and an eyepiece system 3. In the case of a binocular optical system, two such optical systems are arranged in parallel. Although prismatic telescope optical systems (or binocular optical systems) vary in performance, it is common practice that an optical system which is high in magnification for observation (which is hereinafter referred simply as to magnification) is relatively large in size, whereas an optical system having a low magnification is smaller. This is because an increase of magnification requires the objective system to have a larger focal length. If, however, optical systems vary in appearance and shape according to their magnification, differing parts must be used in accordance with the magnification of the optical system and thus mass production becomes difficult. This situation exerts an adverse influence on costs. It is therefore favorable that the overall lengths of the optical systems are equal regardless of their magnifications.

In the past, the magnification of a prismatic telescope (or of a pair of binoculars) has been changed by any of the following techniques of:

(1) replacing the objective system (but not the eyepiece system) with another to change the focal length of the objective system without changing the focal length of the eyepiece system, (2) replacing the eyepiece systems (but not to the objective system) with another to change the focal length of the eyepiece system without changing the focal length of the objective system and (3) replacing the objective system and the eyepiece system with others to change the focal lengths of the objective system and the eyepiece system.

According to the first and second techniques mentioned above, if, between a plurality of optical systems having different magnifications, prism units are identical in length and refractive index, the overall lengths of the optical systems will vary as the magnifications of the optical systems are changed. With the third technique, however, it is possible to make the overall lengths of the optical systems equal, even though the magnifications are changed.

These conventional techniques, however, involve various problems as follows:

The first technique is such that if the magnification of an optical system is made high, the focal length of its objective system will increase and thus the overall length of the optical system will also increase. This makes it impossible to equalize the respective overall lengths of a plurality of optical systems having different magnifications so as to use common machine parts. If, in particular, common optical elements cannot be used, parts for the exclusive use of each of the optical systems must be prepared, thus causing a considerable increase in cost because of an extra expense for molds, for example. Furthermore, if a plurality of optical systems are not be constructed to have identical overall lengths, the design of their respective appearance must be modified. If, for example, a balanced design is obtained in an optical system having a low magnification, the objective system of this optical system when changed to a high magnification becomes greater in length, with the result that the balance of the entire optical system is destroyed. Conventionally in order to make the overall length of the optical system unchanged even when the focal length of the objective system is increased, a negative lens system is added to the objective system or a cemented lens is separated. This arrangement, however, is attended with an increase in the number of lenses and difficulty in assembly, and forms a chief cause of higher raising costs in the manufacturing process.

The second technique is such that since the eye-piece system having a large number of lenses must in general be designed so that it is for the exclusive use of each of a plurality of optical systems, expenses for jigs and tools are increased, causing high cost. Thus, conventionally in order to increase the magnification of an optical system, the focal length of the eyepiece system is reduced. However, the result is that the difficulty of correction for aberration is enhanced and the number of lenses increases to cause a rise in cost. A reduction of the focal length of the eyepiece system makes the position of the eyepoint liable to be lower, and as such the optical system is hard to handle. Moreover, it is generally difficult to make the overall lengths of the optical systems equal by changing only the focal length of the eyepiece system. If the overall lengths are forced to coincide with one another, the performance of the entire optical system is liable to deteriorate, and it becomes necessary to enlarge the number of lenses to correct this deterioration. Consequently, the entire optical system requires the formed parts to be further modified, bringing about even higher costs.

The third technique increases the number of degrees of design freedom of an optical system and facilitates the improvement of its performance. However, lens elements are designed to correspond to each of a plurality of optical systems, and thus expenses for jigs and tools are raised causing higher costs. If the overall lengths of the optical systems are made identical so that machine parts are used for any of the optical systems, it is required that the focal length of the eyepiece system be reduced as the magnification of the lens system is increased. Hence, the number of lenses is enlarged to correct for aberrations with the result being higher, a lower position of the eyepoint, and harder to handle optical system.

SUMMARY OF THE INVENTION

It is, therefore, an object of the present invention to provide a prismatic telescope optical system which is designed so that in a plurality of prismatic telescope optical systems having magnifications different from one another (namely, having objective systems and eyepiece systems of different focal lengths, their overall lengths are made equal, irrespective of the different magnifications, by varying the constructions of respective image erecting prism systems included in the plurality of optical systems.

The present invention is directed to the prism optical systems of telescopes, each having an objective system, an image erecting prism system, and an eyepiece system. These telescopes are different in magnification from one another, but are equal in overall length. According to one aspect of the present invention, in order to equalize the overall lengths to one another, the refractive index of the prism optical system of one telescope is different from that of another telescope. According to another aspect of the present invention, in order to equalize the overall lengths, the refractive indices and lengths of the prism optical systems are different from one another. According to still another aspect of the present invention, in order to equalize the overall lengths, the prism optical system of one telescope includes a hollow mirror prism and that of another telescope includes a glass prism having a proper refractive index.

In this way, according to the present invention, even with a plurality of optical systems which are different in magnification from one another, their respective overall lengths can be made identical by changing the constructions of the image erecting prism systems. Thus, identical machine parts can be used for any of the optical systems, and an identical design can accommodate all of them. Since some of the constituent elements of the optical systems can be used in common, it is possible to reduce expenses for jigs and tools and reduce costs in the manufacturing process of the optical systems. Furthermore, since the focal length of the eyepiece system can be maintained at an optimal condition, a prismatic telescope optical system can be realized which handles easily, without the difficulty of the lowered position of the eyepoint.

The image erecting prism system in the optical system of the present invention is provided for the purpose of erecting an image formed by the objective system, so that Porro prisms and roof prisms can be used. Glass prisms whose interiors are filled with glass and mirror prisms filled with air may also be used. The mirror prism is such that mirrors are arranged at the positions of reflecting surfaces of prisms and shaped into a prism-like form. Since the interior of the mirror prism is filled with air alone, its refractive index is 1.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 3 is a sectional view, developed along the optical axis, showing an arrangement of a first embodiment of a prismatic telescope optical system according to the present invention;

FIGS. 4A, 4B, and 4C are aberration curve diagrams showing aberration, astigmatism, and chromatic aberration of magnification, respectively, of the optical system in FIG. 3;

FIG. 5 is a sectional view, developed along the optical axis, showing another arrangement of the first embodiment of the prismatic telescope optical system according to the present invention;

FIGS. 6A, 6B, and 6C are aberration curve diagrams showing aberration, astigmatism, and chromatic aberration of magnification, respectively, of the optical system in FIG. 5;

FIGS. 8A, 8B, and 8C are aberration curve diagrams showing aberration, astigmatism, and chromatic aberration of magnification, respectively, of the optical system in FIG. 7;

FIGS. 10A, 10B, and 10C are aberration curve diagrams showing aberration, astigmatism, and chromatic aberration of magnification, respectively, of the optical system in FIG. 9;

FIGS. 12A, 12B, and 12C are aberration curve diagrams showing aberration, astigmatism, and chromatic aberration of magnification, respectively, of the optical system in FIG. 11;

FIGS. 14A, 14B, and 14C are aberration curve diagrams showing aberration, astigmatism, and chromatic aberration of magnification, respectively, of the optical system in FIG. 13.

DETAILED DESCRIPTION OF THE PREFERRED EMBODIMENTS

Before undertaking the description of the embodiments of the present invention, it will be expedient to explain the function of a prism.

Figure 1:
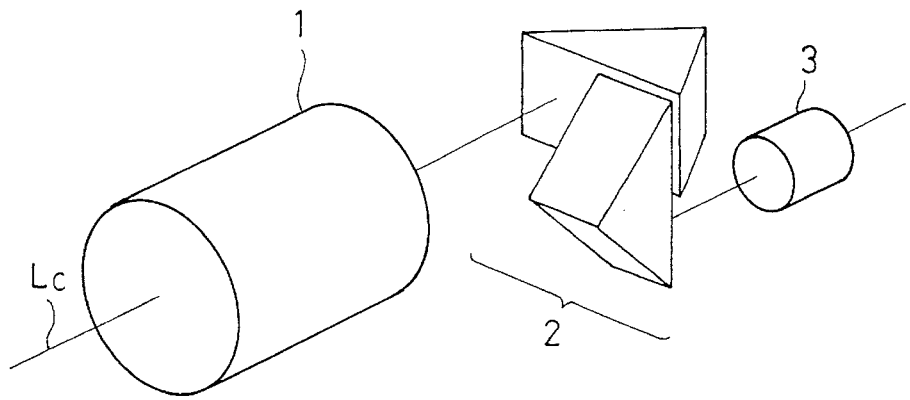
FIG. 1 is a conceptual view showing the arrangement of a conventional prismatic telescope optical system.
Figure 2A:
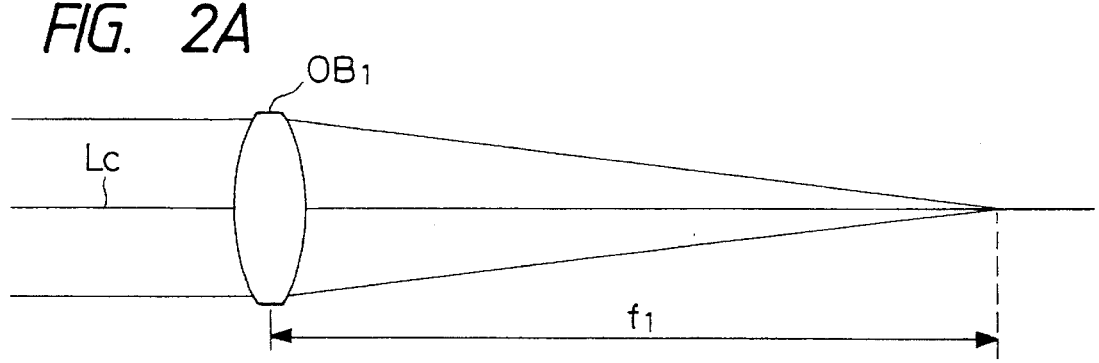
FIGS. 2A and 2B are views for explaining the function of a prism.
Figure 2B:
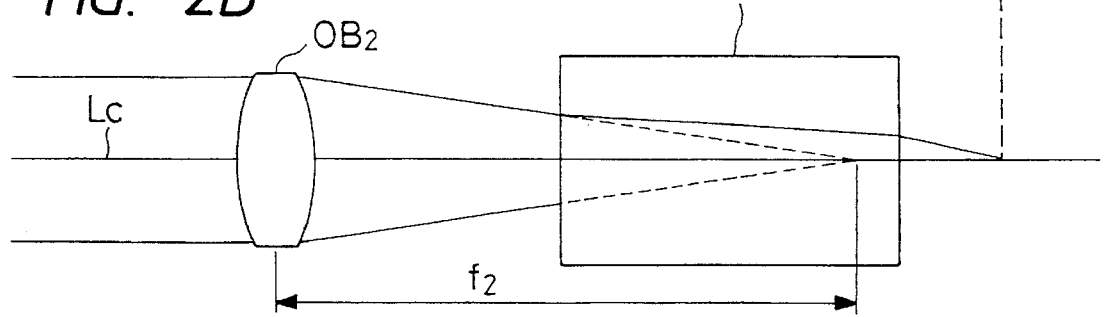

FIG. 2A shows an objective lens $OB_1$ having a long focal length $f_1$, and FIG. 2B shows an objective lens $OB_2$ having a short focal length $f_2$. As shown in FIG. 2B, when a glass member 4 is disposed in the optical path, rays are refracted and thus the position where they cross an optical axis $L_C$ is far from the objective lens $OB_2$ compared with the case where the glass member 4 is not disposed. A proper selection of the length and refractive index of the glass member 4 enables the imaging position of the objective lens $OB_2$ having a short focal length shown in FIG. 2B to coincide with that of the objective lens $OB_1$ having a long focal length in FIG. 2A.

The refractive index of air is 1, and thus if a glass member (or plastic member) of a refractive index n and a length L is disposed at the place where air exists, a distance from the objective lens to the image will extend by $(n-1)L$. In FIGS. 2A and 2B, the case where the glass member is placed in one of the optical paths of two objective lenses is shown. If, however, glass members are arranged in both the optical paths, distances shown in these figures, each from the objective lens to the image, will extend together. Calling $n_L$ the refractive index of a glass member (prism) inserted in the optical path of the objective lens having a short focal length, $L_L$ the length of the glass member, $n_H$ the refractive index of a glass member (prism) inserted in the optical path of the objective lens having a long focal length, and $L_H$ the length of this glass member, the difference in the distance from the lens surface to the imaging position between the objective lenses with long and short focal lengths is given by $$(n_L-1)L_L-(n_H-1)L_H \qquad (1)$$

If the lengths of the two glass members are equal, $L_L=L_H$, and hence the difference between the distances from the two objective lenses to their corresponding image positions becomes $(n_L-n_H)L_L$. If, therefore, the refractive index of the prism inserted in the optical path of the objective lens with a short focal length is increased, the optical path of the objective lens with a short focal length will extend over a longer distance from the objective lens to the imaging position. In this way, the imaging positions of the two objective lenses can be made to coincide.

Here, consider a plurality of prismatic telescope optical systems of high and low magnifications, having identical eyepiece systems. If the lengths and refractive indices of the prisms are identical, the focal length of the objective lens is less in a low-magnification optical system, and thus the distance from the first surface of the objective system to the imaging position is shorter as a matter of course. In a high-magnification optical system, on the other hand, the focal length of the objective system is greater, and therefore the distance from the first surface of the objective system to the imaging position is longer. In this way, the overall length of the low-magnification optical system is less, while that of the high-magnification optical system is greater.

Hence, the low-magnification optical system is designed so that the prism is configured with a glass member of a high refractive index to extend the distance to the imaging position, while the high-magnification optical system is designed so that the prism is configured with a glass member of a low refractive index or only mirrors to moderately extend the distance to the imaging position. It is thus possible to equalize the distances, each from the first surface of the objective system to the imaging position, of the plurality of prismatic telescope optical systems having different magnifications.

Moreover, it is also possible to set the prisms to the same axial length in the high- and low-magnification optical systems by a proper choice of the lengths and refractive indices of the prisms. In this way, if the prisms are constructed so that their shapes are exactly the same but only their refractive indices vary, they are applicable to both the high- and low-magnification optical systems, and thus no change of mechanical dimensions is required.

In the high-magnification optical system, the prism is set to have a minimum axial length required for a prism (depending on the F-number of the objective system and the shape of the prism) and a proper refractive index, whereas in the low-magnification optical system, the prism is set to proper length and refractive index so that the optical system has the overall length equivalent to the high-magnification optical system. By doing so, although the high- and low-magnification optical systems are different in prism shape (length), each of their overall lengths can be kept to a minimum as a glass prism. On the other hand, it is also possible to increase the difference in magnification between the high- and low-magnification optical systems, although the overall lengths of the optical systems are not very small.

Furthermore, even in the case where the high-magnification optical system uses a mirror prism whose interior is filled with air and the low-magnification optical system is designed so that the prism is set to a proper length and refractive index to have the overall length equal to the high-magnification optical system, each of the overall lengths can be set to a minimum. By this technique, it is also possible to increase the difference in magnification between the high- and low-magnification optical systems, although their overall lengths are not very small.

To configure the prisms with glass members, reference is made to the conditions of glass materials in the high- and low-magnification optical systems. The conditions of materials depend naturally on how the magnifications of the optical systems are set (for example, seven- and eightfold, seven- and ninefold, etc.). It is generally convenient for the low-magnification optical system to set the prism to the highest possible refractive index because the overall length of the optical system can be adjusted by a short glass prism. For the high-magnification optical system, on the other hand, the lowest possible prism index is advantageous because the overall length of the optical system can be adjusted by a long glass prism. Hence, it is advisable that the difference between the refractive indices is approximately defined by $$|n_{dL}-n_{dH}|>0.05 \qquad (2)$$

where $n_{dL}$ is the refractive index of the d-line of the prism material used in the low-magnification optical system and $n_{dH}$ is the refractive index of the d-line of the prism material used in the high-magnification optical system. If the values of $n_{dL}$ and $n_{dH}$ deviate from the limit of Eq. (2), the difference between the refractive indices of the prisms of the high- and low-magnification optical systems becomes insufficient, and thus the lengths of the prisms are too long to make the overall lengths of the optical systems coincide. Consequently, not only is the realization of compactness of the entire optical system impossible, but also the production of chromatic aberration becomes pronounced. Moreover, the weight of the entire optical system, as well as the volume, is increased, and expense for the prism materials is also increased.

An Abbe's number $\nu_d$ is now taken as $$\nu_d=(n_d-1) / (n_f-n_c) \qquad (3)$$

where $n_d$ is the refractive index of the d-line of the prism material, $n_f$ is the refractive index of the f-line of the prism material, and $n_c$ is the refractive index of the c-line of the prism material. In order that the optical systems are properly corrected for axial chromatic aberration and chromatic aberration of magnification, it is preferable that the difference between Abbe's numbers is approximately defined by $$|\nu_{dL}-\nu_{dH}|<35 \qquad (4)$$

where $\nu_{dL}$ is the Abbe's number of the prism material used in the low-magnification optical system and $\nu_{dH}$ is the Abbe's number of the prism material used in the high-magnification optical system. If the values of $\nu_{dL}$ and $\nu_{dH}$ deviate from the limit of Eq. (4), chromatic aberration cannot be completely corrected even though the eyepiece and objective systems are designed for the exclusive use of each of the high- and low-magnification optical systems.

In accordance with the embodiments shown in the drawings, the present invention will be explained below.

First embodiment

An optical system shown in FIG. 3 is a prismatic telescope optical system having a magnification of 7×, which in order from the object side, is constructed with an objective system 11, an image erecting prism system 12, and an eyepiece system 13. Reference numeral 14 represents an eyepoint and symbol Lc denotes an optical axis. FIGS. 4A, 4B, and 4C are the aberration diagrams of the optical system shown in FIG. 3. An optical system depicted in FIG. 5 is a prismatic telescope optical system having a magnification of 8×, which in order from the object side, is constructed with an objective system 15, an image erecting prism system 16, and the eyepiece system 13. FIGS. 6A, 6B, and 6C are the aberration diagrams of the optical system shown in FIG. 5.

In the first embodiment, the overall lengths of two optical systems mentioned above are made substantially equal in such a way that the prisms are identical in length and vary in refractive index.

The following is the numerical data of lenses of the optical systems according to the first embodiment. [Prismatic telescope optical system shown in FIG. 3] Focal length of the objective system, $f_{OB}$=79.45; Focal length of the eyepiece system, $f_{OC}$=11.35; Magnification B=7.00; Entrance pupil diameter $\phi$=20.0; Apparent field of view 2w=48.82; Distance from the last lens surface of the eyepiece system to the eyepoint, EP=11.0; Overall length of the optical system where an object point is brought to a focus at infinity (a paraxial image plane is set to $-1$ m$^{-1}$), $\Sigma d$=142.1755

(Objective system)

| | | | |
|---|---|---|---|
| $r_1$ = 43.084 | | | |
| | $d_1$ = 4.2 | $n_1$ = 1.50997 | $v_1$ = 62.10 |
| $r_2$ = $-37.5023$ | | | |
| | $d_2$ = 1.5 | $n_2$ = 1.62606 | $v_2$ = 39.21 |
| $r_3$ = 159.9508 | | | |
| | $d_3$ = 15.7954 | | |

(Image erecting prism system)

| | | | |
|---|---|---|---|
| $r_4$ = $\infty$ | | | |
| | $d_4$ = 45.915 | $n_4$ = 1.88300 | $v_4$ = 40.78 |
| $r_5$ = $\infty$ | | | |
| | $d_5$ = 1.9 | | |
| $r_6$ = $\infty$ | | | |
| | $d_6$ = 45.915 | $n_6$ = 1.88300 | $v_6$ = 40.78 |
| $r_7$ = $\infty$ | | | |
| | $d_7$ = 15.5 | | |

(Eyepiece system)

| | | | |
|---|---|---|---|
| $r_8$ = 279.7727 | | | |
| | $d_8$ = 1.2 | $n_8$ = 1.78470 | $v_8$ = 26.30 |
| $r_9$ = 11.1726 | | | |
| | $d_9$ = 6.0 | $n_9$ = 1.58313 | $v_9$ = 59.38 |
| $r_{10}$ = $-13.7884$ | | | |
| | $d_{10}$ = 0.25 | | |
| $r_{11}$ = 13.6542 | | | |
| | $d_{11}$ = 4.0 | $n_{11}$ = 1.58913 | $v_{11}$ = 61.18 |
| $r_{12}$ = $-37.7519$ | | | |

[Prismatic telescope optical system shown in FIG. 5]

| | | | |
|---|---|---|---|
| $f_{OB}$ = 90.80, | $f_{OC}$ = 11.35, | B = 8.00, | $\phi$ = 20.0, |
| 2w = 48.82, | EP = 11.0, | $\Sigma d$ = 142.2226 | |

(Objective system)

| | | | |
|---|---|---|---|
| $r_1$ = 53.287 | | | |
| | $d_1$ = 4.2 | $n_1$ = 1.51633 | $v_1$ = 64.15 |
| $r_2$ = $-40.6379$ | | | |
| | $d_2$ = 1.5 | $n_2$ = 1.62045 | $v_2$ = 38.12 |
| $r_3$ = $-157.1044$ | | | |
| | $d_3$ = 15.8426 | | |

(Image erecting prism system)

| | | | |
|---|---|---|---|
| $r_4$ = $\infty$ | | | |
| | $d_4$ = 45.915 | $n_4$ = 1.52310 | $v_4$ = 50.84 |
| $r_5$ = $\infty$ | | | |
| | $d_5$ = 1.9 | | |
| $r_6$ = $\infty$ | | | |
| | $d_6$ = 45.915 | $n_6$ = 1.52310 | $v_6$ = 50.84 |
| $r_7$ = $\infty$ | | | |
| | $d_7$ = 15.5 | | |

(Eyepiece system)

| | | | |
|---|---|---|---|
| $r_8$ = 279.7727 | | | |
| | $d_8$ = 1.2 | $n_8$ = 1.78470 | $v_8$ = 26.30 |
| $r_9$ = 11.1726 | | | |
| | $d_9$ = 6.0 | $n_9$ = 1.58313 | $v_9$ = 59.38 |
| $r_{10}$ = $-13.7884$ | | | |
| | $d_{10}$ = 0.25 | | |
| $r_{11}$ = 13.6542 | | | |
| | $d_{11}$ = 4.0 | $n_{11}$ = 1.58913 | $v_{11}$ = 61.18 |
| $r_{12}$ = $-37.7519$ | | | |

Second embodiment

Figure 7:
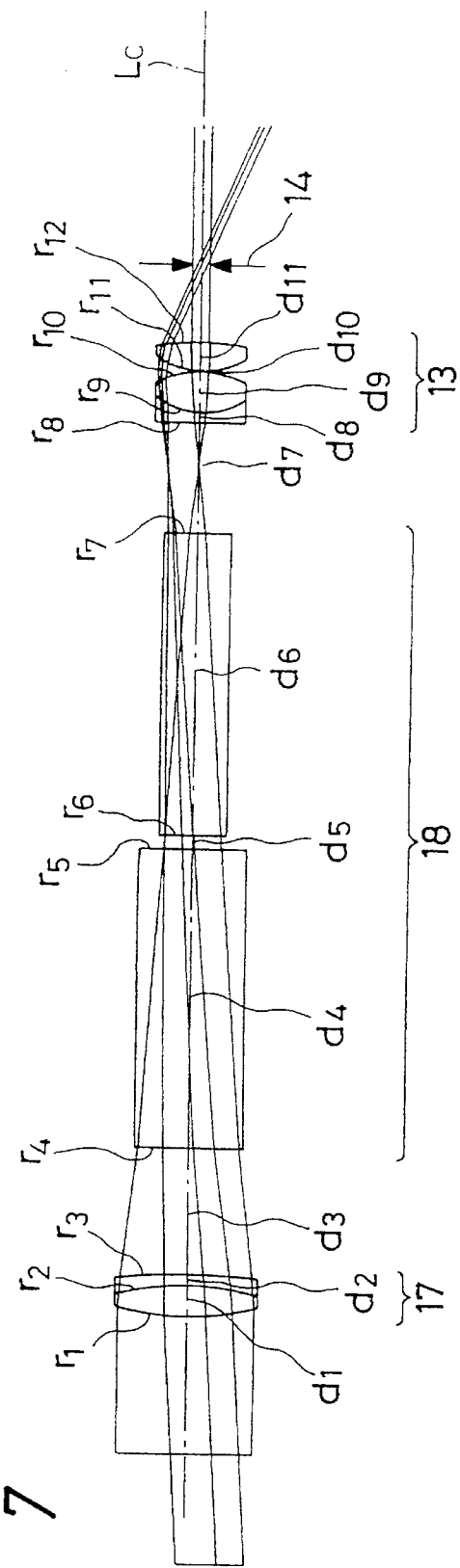
FIG. 7 is a sectional view, developed along the optical axis, showing an arrangement of a second embodiment of the prismatic telescope optical system according to the present invention.
Figure 9:
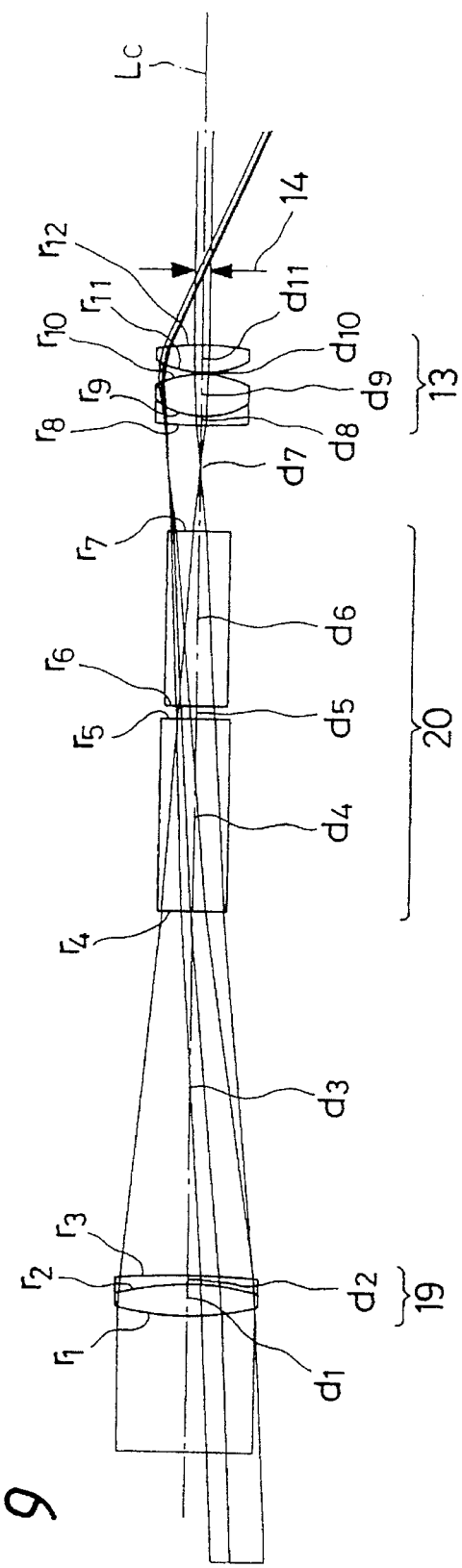
FIG. 9 is a sectional view, developed along the optical axis, showing another arrangement of the second embodiment of the prismatic telescope optical system according to the present invention.

An optical system shown in FIG. 7 is a prismatic telescope optical system having magnification of 7×, which in order from the object side, is constructed with an objective system 17, an image erecting prism system 18, and the eyepiece system 13. FIGS. 8A, 8B, and 8C are the aberration diagrams of the optical system shown in FIG. 7. An optical system depicted in FIG. 9 is a prismatic telescope optical system having a magnification of 9×, which in order from the object side, is constructed with an objective system 19, an image erecting prism system 20, and the eyepiece system 13. FIGS. 10A, 10B, and 10C are the aberration diagrams of the optical system shown in FIG. 9.

In the second embodiment, the overall lengths of two optical systems mentioned above are made substantially equal in such a way that the prisms vary in length and refractive index.

The following is the numerical data of lenses of the optical systems according to the second embodiment. [Prismatic telescope optical system shown in FIG. 7] $f_{OB}$=79.45, $f_{OC}$=11.35, B=7.00, $\phi$=20.0, 2w=48.82, EP=11.0, $\Sigma d$=140.2388

(Objective system)

| | | | |
|---|---|---|---|
| $r_1$ = 43.084 | | | |
| | $d_1$ = 4.2 | $n_1$ = 1.50977 | $v_1$ = 62.10 |
| $r_2$ = $-37.5023$ | | | |
| | $d_2$ = 1.5 | $n_2$ = 1.62606 | $v_2$ = 39.21 |
| $r_3$ = $-159.9508$ | | | |
| | $d_3$ = 17.9887 | | |

(Image erecting prism system)

| | | | |
|---|---|---|---|
| $r_4$ = $\infty$ | | | |
| | $d_4$ = 43.85 | $n_4$ = 1.88300 | $v_4$ = 40.78 |
| $r_5$ = $\infty$ | | | |
| | $d_5$ = 1.9 | | |
| $r_6$ = $\infty$ | | | |
| | $d_6$ = 43.85 | $n_6$ = 1.88300 | $v_6$ = 40.78 |
| $r_7$ = $\infty$ | | | |
| | $d_7$ = 15.5 | | |

(Eyepiece system)

| | | | |
|---|---|---|---|
| $r_8$ = 279.7727 | | | |
| | $d_8$ = 1.2 | $n_8$ = 1.78470 | $v_8$ = 26.30 |
| $r_9$ = 11.1726 | | | |
| | $d_9$ = 6.0 | $n_9$ = 1.58313 | $v_9$ = 59.38 |
| $r_{10}$ = $-13.7884$ | | | |
| | $d_{10}$ = 0.25 | | |
| $r_{11}$ = 13.6542 | | | |
| | $d_{11}$ = 4.0 | $n_{11}$ = 1.58913 | $v_{11}$ = 61.18 |
| $r_{12}$ = $-37.7519$ | | | |

[Prismatic telescope optical system shown in FIG. 9]

| | | | |
|---|---|---|---|
| $f_{OB}$ = 102.15, | $f_{OC}$ = 11.35, | B = 9.00, | $\phi$ = 20.0, |
| 2w = 48.82, | EP = 11.0, | $\Sigma d$ = 140.0772 | |

(Objective system)

| | | | |
|---|---|---|---|
| $r_1$ = 56.3555 | | | |
| | $d_1$ = 4.2 | $n_1$ = 1.51633 | $v_1$ = 64.15 |
| $r_1$ = $-48.9783$ | | | |
| | $d_2$ = 1.5 | $n_2$ = 1.64769 | $v_2$ = 33.80 |
| $r_3$ = $-193.5531$ | | | |
| | $d_3$ = 52.5272 | | |

(Image erecting prism system)

| | | | |
|---|---|---|---|
| $r_4$ = $\infty$ | | | |
| | $d_4$ = 28.000 | $n_4$ = 1.52310 | $v_4$ = 50.84 |
| $r_5$ = $\infty$ | | | |

-continued

|  | $d_5 = 1.9$ |  |  |
|---|---|---|---|
| $r_6 = \infty$ | | | |
| | $d_6 = 25.000$ | $n_6 = 1.52310$ | $v_6 = 50.84$ |
| $r_7 = \infty$ | | | |
| | $d_7 = 15.5$ | | |
| (Eyepiece system) | | | |
| $r_8 = 279.7727$ | | | |
| | $d_8 = 1.2$ | $n_8 = 1.78470$ | $v_8 = 26.30$ |
| $r_9 = 11.1726$ | | | |
| | $d_9 = 6.0$ | $n_9 = 1.58313$ | $v_9 = 59.38$ |
| $r_{10} = -13.7884$ | | | |
| | $d_{10} = 0.25$ | | |
| $r_{11} = 13.6542$ | | | |
| | $d_{11} = 4.0$ | $n_{11} = 1.58913$ | $v_{11} = 61.18$ |
| $r_{12} = -37.7519$ | | | |

Third embodiment

Figure 11:
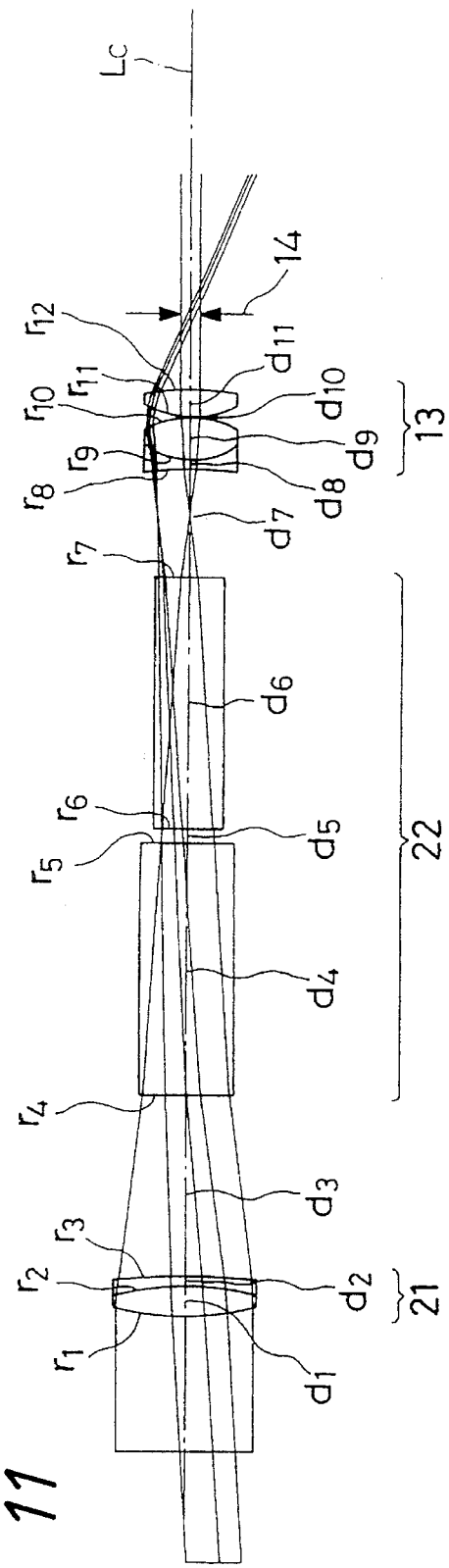
FIG. 11 is a sectional view, developed along the optical axis, showing an arrangement of a third embodiment of the prismatic telescope optical system according to the present invention.
Figure 13:
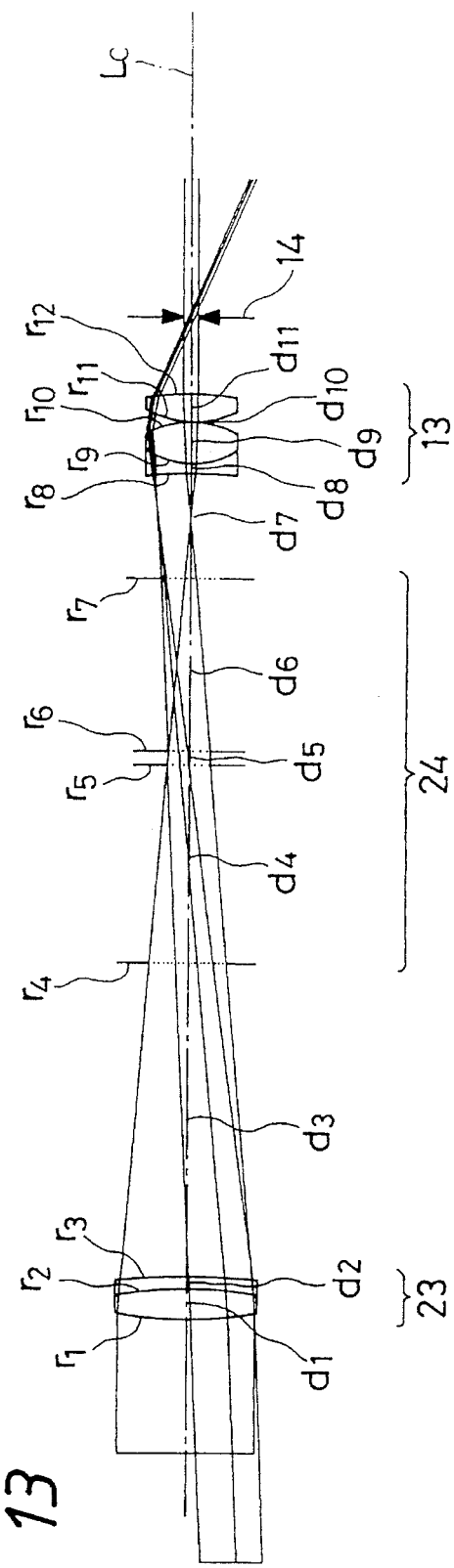
FIG. 13 is a sectional view, developed along the optical axis, showing another arrangement of the third embodiment of the prismatic telescope optical system according to the present invention.

An optical system shown in FIG. 11 is a prismatic telescope optical system having a magnification of 7×, which in order from the object side, is constructed with an objective system 21, an image erecting prism system 22, and the eyepiece system 13. FIGS. 12A, 12B, and 12C are the aberration diagrams of the optical system shown in FIG. 11. An optical system depicted In FIG. 13 is a prismatic telescope optical system having a magnification of 10×, which in order from the object side, is constructed with an objective system 23, an image erecting prism system 24, and the eyepiece system 13. FIGS. 14A, 14B, and 14C are the aberration diagrams of the optical system shown in FIG. 13.

In the third embodiment, the overall lengths of two optical systems mentioned above are made substantially equal by using a mirror prism unit.

The following is the numerical data of lenses of the optical systems according to the third embodiment. [Prismatic telescope optical system shown in FIG. 11] $f_{OB}$= 79.45, $f_{OC}$=11.35, B=7.00, $\phi$=20.0, 2w=48.82, EP=11.0, $\Sigma$d=133.2473

| (Objective system) | | | |
|---|---|---|---|
| $r_1 = 43.084$ | | | |
| | $d_1 = 4.2$ | $n_1 = 1.50977$ | $v_1 = 62.10$ |
| $r_2 = -37.5023$ | | | |
| | $d_2 = 1.5$ | $n_2 = 1.62606$ | $v_2 = 39.21$ |
| $r_3 = -159.9508$ | | | |
| | $d_3 = 26.2973$ | | |
| (Image erecting prism system) | | | |
| $r_4 = \infty$ | | | |
| | $d_4 = 36.20$ | $n_4 = 1.88300$ | $v_4 = 40.78$ |
| $r_5 = \infty$ | | | |
| | $d_5 = 1.9$ | | |
| $r_6 = \infty$ | | | |
| | $d_6 = 36.20$ | $n_6 = 1.88300$ | $v_6 = 40.78$ |
| $r_7 = \infty$ | | | |
| | $d_7 = 15.5$ | | |
| (Eyepiece system) | | | |
| $r_8 = -73.0519$ | | | |
| | $d_8 = 1.2$ | $n_8 = 1.80518$ | $v_8 = 25.43$ |
| $r_9 = 11.2293$ | | | |
| | $d_9 = 6.0$ | $n_9 = 1.69680$ | $v_9 = 55.53$ |
| $r_{10} = -14.378$ | | | |
| | $d_{10} = 0.25$ | | |
| $r_{11} = 14.2694$ | | | |
| | $d_{11} = 4.0$ | $n_{11} = 1.58913$ | $v_{11} = 61.18$ |
| $r_{12} = -42.6228$ | | | |

[Prismatic telescope optical system shown in FIG. 13]

| $f_{OB} = 113.50$, | $f_{OC} = 11.35$, | B = 10.00, | $\phi = 20.0$, |
|---|---|---|---|
| 2w = 48.82, | EP = 11.0, | $\Sigma$d = 133.1653 | |

| (Objective system) | | | |
|---|---|---|---|
| $r_1 = 57.8370$ | | | |
| | $d_1 = 4.2$ | $n_1 = 1.51633$ | $v_1 = 64.15$ |
| $r_2 = -57.2216$ | | | |
| | $d_2 = 1.5$ | $n_2 = 1.67270$ | $v_2 = 32.10$ |
| $r_3 = -255.9621$ | | | |
| | $d_3 = 45.6152$ | | |
| (Image erecting prism system (mirror)) | | | |
| $r_4 = \infty$ | | | |
| | $d_4 = 28.000$ | | |
| $r_5 = \infty$ | | | |
| | $d_5 = 1.9$ | | |
| $r_6 = \infty$ | | | |
| | $d_6 = 25.000$ | | |
| $r_7 = \infty$ | | | |
| | $d_7 = 15.5$ | | |
| (Eyepiece system) | | | |
| $r_8 = -73.0519$ | | | |
| | $d_8 = 1.2$ | $n_8 = 1.80518$ | $v_8 = 25.43$ |
| $r_9 = 11.2293$ | | | |
| | $d_9 = 6.0$ | $n_9 = 1.69680$ | $v_9 = 55.53$ |
| $r_{10} = -14.3780$ | | | |
| | $d_{10} = 0.25$ | | |
| $r_{11} = 14.2694$ | | | |
| | $d_{11} = 4.0$ | $n_{11} = 1.58913$ | $v_{11} = 61.18$ |
| $r_{12} = -42.6228$ | | | |

In each embodiment mentioned above, $r_1, r_2, \ldots$ represent radii of curvature of individual lens (or prism) surfaces; $d_1, d_2, \ldots$ thicknesses of individual lenses (or prisms) or spaces therebetween; $n_1, n_2, \ldots$ refractive indices of individual lenses (or prisms); and $v_1, v_2, \ldots$ Abbe's numbers of individual lenses (or prisms).

The eyepiece systems of the optical systems shown in each embodiment are identical. However, even though neither the objective systems nor the eyepiece systems need be identical, it is possible to construct the optical systems so that their overall lengths are nearly equal.

What is claimed is:

1. A telescope optical system including one optical system selected from a plurality of substantially equal overall length but different observation magnification optical systems, said selection providing a desired observation magnification for said telescope optical system, each of said plurality of optical systems comprising, in order from an image side:

an objective system;

a prism system; and an eyepiece system;

a first optical system of said plurality of optical systems having a first observation magnification, and a second optical system of said plurality of optical systems having a second observation magnification different from said first observation magnification;

each of said plurality of optical systems having a substantially equal overall length; and said prism system of said first optical system having a first refractive index, and said prism system of said second optical system having a second refractive index different from said first refractive index, whereby said first optical system has said different observation magnification yet said substantially equal overall length as compared to said second optical system.

2. A telescope optical system including one optical system selected from a plurality of substantially equal overall length but different observation magnification optical systems, said selection providing a desired observation magnification for said telescope optical system, each of said plurality of optical systems comprising, in order from an image side:

an objective system;

a prism system; and an eyepiece system;

a first optical system of said plurality of optical systems having a first observation magnification, and a second optical system of said plurality of optical systems having a second observation magnification different from said first observation magnification;

each of said plurality of optical systems having a substantially equal overall length; and said prism system of said first optical system having a first refractive index and a first length, and said prism system of said second optical system having a second refractive index different from said first refractive index and a second length different from said first length, whereby said first optical system has said different observation magnification yet said substantially equal overall length as compared to said second optical system.

3. A telescope optical system including one optical system selected from a plurality of substantially equal overall length but different observation magnification optical systems, said selection providing a desired observation magnification for said telescope optical system, each of said plurality of optical systems comprising, in order from an image side:

an objective system;

a prism system; and an eyepiece system;

a first optical system of said plurality of optical systems having a first observation magnification, and a second optical system of said plurality of optical systems having a second observation magnification different from said first observation magnification;

each of said plurality of optical systems having a substantially equal overall length;

said prism system of said first optical system being a hollow mirror prism having a first refractive index and said prism system of said second optical system being a glass prism having a second refractive index different from said first refractive index, whereby said first optical system has said different observation magnification yet said substantially equal overall length as compared to said second optical system.

4. A telescope optical system according to one of claim 1–3, wherein:

said eyepiece system included in each of said plurality of optical systems is identical.

5. A telescope optical system according to one of claim 1–3, wherein:

said objective system included in each of said plurality of optical systems is identical.

6. A telescope optical system according to claim 1 or 2, wherein:

said second optical system is a high-magnification optical system, and said first optical system is a low-magnification optical system, said first optical system and said second optical system satisfying the following condition:

$$|n_{dL}-n_{dH}|>0.05$$

where $n_{dL}$ is said first refractive index of said prism system of said low-magnification first optical system, and $n_{dH}$ is said second refractive index of said prism system of said high-magnification second optical system.

7. A telescope optical system according to claim 1 or 2, wherein:

said second optical system is a high-magnification optical system, and said first optical system is a low-magnification optical system, said first optical system and said second optical system satisfying the following condition:

$$|v_{dL}-v_{dH}|<35$$

where $v_{dL}$ is a first Abbe's number of said prism system of said low-magnification first optical system, and $v_{dH}$ a second Abbe's number of said prism system of said high-magnification second optical system.

* * * * *